(12) United States Patent
Nylander et al.

(10) Patent No.: US 8,428,031 B2
(45) Date of Patent: Apr. 23, 2013

(54) METHOD AND APPARATUS FOR FACILITATING HANDOVER FROM A WCDMA PUBLIC LAND MOBILE ACCESS NETWORK TO A GENERIC ACCESS NETWORK

(75) Inventors: Tomas Nylander, Värmdö (SE); Jari Vikberg, Järna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 291 days.

(21) Appl. No.: 12/741,456

(22) PCT Filed: Nov. 8, 2007

(86) PCT No.: PCT/EP2007/009703
§ 371 (c)(1),
(2), (4) Date: May 5, 2010

(87) PCT Pub. No.: WO2009/059622
PCT Pub. Date: May 14, 2009

(65) Prior Publication Data
US 2011/0090864 A1    Apr. 21, 2011

(51) Int. Cl.
*H04W 36/00* (2009.01)
(52) U.S. Cl.
USPC .......................................................... 370/331
(58) Field of Classification Search .......... 370/328–331, 370/338; 455/432.1–455
See application file for complete search history.

(56) References Cited

U.S. PATENT DOCUMENTS

| | | | |
|---|---|---|---|
| 6,768,903 B2 * | 7/2004 | Fauconnier et al. | 455/403 |
| 2006/0094431 A1 * | 5/2006 | Saifullah et al. | 455/436 |
| 2006/0268845 A1 | 11/2006 | He et al. | |

FOREIGN PATENT DOCUMENTS

| | | |
|---|---|---|
| JP | 2003-219449 A | 7/2003 |
| WO | WO 2001/050795 A1 | 7/2001 |
| WO | WO 2006/061670 A | 6/2006 |
| WO | WO 2006061670 A1 * | 6/2006 |
| WO | WO 2007/078043 A2 | 7/2007 |
| WO | WO 2007117190 A1 * | 10/2007 |

* cited by examiner

*Primary Examiner* — Mark Rinehart
*Assistant Examiner* — Kenneth P Hunt (57) ABSTRACT

Handover is improved from a 3 G WCDMA UTRAN to a generic access network (GAN) cell. For handover, mobile stations measure signal level from neighbor cells. In a WCDMA UTRAN, measurement of cells having a frequency number different from the serving cell, require the network to generate time gaps so the mobile station can perform measurements on different frequencies. GAN cells do not transmit on their allotted frequency number. This number together with an identifier is used to identify the GAN cell between the MS and RNC. A modified registration procedure permits GAN cells to always have the same frequency number as neighboring UTRAN cells, wherein the MS communicates the current UTRAN cell frequency number to the GAN controller, which adopts this number, and determines the corresponding identifier. The identifier may be the same for all GAN cells, or can be obtained from a mapping table, which maps an identifier to each frequency.

11 Claims, 3 Drawing Sheets

| Used Frequency/UARFCN for PLMN x | GANC UARFCN | GANC Scrambling code/PSC |
|---|---|---|
| 147 | 147 | 210 |
| 148 | 148 | 220 |
| 149 | 149 | 220 |

| 'Used Frequency'/UARFCN for PLMN y | GANC UARFCN | Scrambling code/PSC |
|---|---|---|
| 160 | 160 | 300 |
| 161 | 161 | 310 |
| 162 | 162 | 340 |

Fig. 3

METHOD AND APPARATUS FOR FACILITATING HANDOVER FROM A WCDMA PUBLIC LAND MOBILE ACCESS NETWORK TO A GENERIC ACCESS NETWORK

TECHNICAL FIELD

The invention is directed generally to unlicensed mobile access (UMA) with particular reference to generic access networks as initially defined in the $3^{rd}$ generation partnership project (3GPP) TS 43.318 and 44.318 for 3GPP Releases 6 and 7. It relates specifically to the handover of mobile stations or user equipment from $3^{rd}$ generation public land mobile access networks based on Wideband Code Division Multiple Access (WCDMA) technology to a generic access network and to the support of this handover.

BACKGROUND ART

Unlicensed mobile access generally describes the accessing of public land mobile networks using access networks that utilise a typically low-power unlicensed-radio interface to communicate with mobile stations. Existing access networks typically include broadband networks that may include both wireless and wired portions, preferably IP networks, such as wireless LANs, in which higher layer protocols, for example, the GSM protocols, are run over an IP network rather than over the associated GSM radio layer. An access network controller communicates over the IP network with mobile stations that are connected to the network via access points. The access network controller also controls the interface with the public mobile network core elements that provide specific services to the mobile stations depending on the type of the public mobile core network. A security gateway also forms part of the access network and is either combined with the access network controller in a single node or implemented as a separate node. Access networks of this type have been used to provide access to second generation PLMNs including GSM (Global System for Mobile Communication), EDGE (Enhanced Data rates for GSM Evolution) and GPRS (General Packet Radio Service networks). In this context, unlicensed access networks are referred to as generic access networks (GAN) and the access network controller is called a generic access network controller or GANC, which includes a microprocessor connected with a non-transient memory containing instructions for carrying out the operations of the GANC.

Work is now ongoing in 3GPP for Release 8 to specify generic access networks for third generation services UMTS (Universal Mobile Telecommunications System) or WCDMA (Wideband Code Division Multiple Access). The corresponding technical specifications will be called 3GPP TS 43.319 and 44.319 and will also include the previous content from specifications 43.318 and 44.318 in 3GPP Releases 6 and 7. The generic access network is essentially transparent when viewed from the PLMN core network nodes. This is achieved by the GANC utilising the standard PLMN interfaces towards the various nodes. The existing 3GPP Releases 6 and 7 define how second generation mobile services are supported in the GANC and in a PLMN where access is provided by a GANC. Second generation (2G) mobile services are generally understood to comprise GSM (Global System for Mobile Communication), EDGE (Enhanced Data rates for GSM Evolution) and GPRS (General Packet Radio Service networks) services. The GANC thus utilises the A-interface towards the mobile services switching center MSC for 2G voice traffic (as defined in as defined in 3GPP TS 48.008) and the Gb-interface towards the serving GPRS support node SGSN when providing access to 2G/GPRS services (as defined in 3GPP TS 48.018). With the ongoing specification of generic access networks for third generation (3G) services, i.e. UMTS (Universal Mobile Telecommunications System) or WCDMA, the GANC provides access to 3G services (WCDMA/UMTS) and uses the Iu-cs interface towards the MSC and the Iu-ps interface towards the SGSN (as defined in 3GPP TS 25.410). The GANC selects the required mode of operation for each MS connected to it, and uses this mode as long as the MS is connected to the GANC. The existing mode of operation is called GAN A/Gb mode and the new mode of operation being specified is to be called GAN Iu mode.

The GANC (also called GAN cell) is identified differently for the mobile stations depending on which mode of operation is selected. These identifiers are used for example in idle mobility management procedures and when triggering either circuit-switched (CS) or packet-switched (PS) handover from the GSM or WCDMA (i.e. from GERAN or UTRAN) to the GAN. In GAN A/Gb mode, the GANC is identified as a GSM/GERAN cell using a cell global identity (CGI), an absolute radio frequency channel number (ARFCN) and base transceiver station identity code (BSIC) in the same way as GSM/GERAN cells are identified in GERAN and UTRAN. In GAN Iu mode, on the other hand, the GANC is identified as a WCDMA/UTRAN cell using a location area identity (LAI), 3G cell identity, a universal terrestrial radio access (UTRA) Absolute Radio Frequency Channel Number (UARFCN) and a primary scrambling code (PSC) in the same way as WCDMA/UTRAN cells are identified in GERAN and UTRAN. This also means that there is a difference in the way CS or PS handover (or relocation) procedures are triggered towards GAN A/Gb mode or towards GAN Iu mode. In GAN A/Gb mode, the conventional GSM/GERAN CS and PS handover procedures are used, as the GANC (or the GAN cell) is identified as a GSM/GERAN cell. In the same way, the CS or PS handover or relocation towards GAN in the GAN Iu mode uses the existing CS and PS handover procedures for WCDMA/UTRAN.

Handover from a PLMN access network to a generic access network is complicated by the lack of configured detailed information in the PLMN core network concerning the generic access network and the different access points used in the generic access network. Generic access networks preferably follow the principles of plug-and-play with access points to the generic access network being relatively small and easy to install, and registration of user equipment with the generic access network at different locations being possible independently of any PLMN coverage. This flexibility makes it near impossible to configure all PLMN's and all generic access networks with the data conventionally necessary for handover. For this reason, configuration of the PLMN and GAN elements is kept to a minimum. For example, in preparation for handover from a $3^{rd}$ generation public mobile access network (also known as a UMTS access network or UTRAN) to a generic access network operating in GAN Iu mode, the radio network controller RNC of the UTRAN, when ordering the mobile station to make radio frequency measurements for neighbouring cells, includes a frequency number (the UARFCN) and scrambling code used on the identified frequency (the PSC) associated with the targeted generic access network controller (GANC). However, the corresponding frequency is not actually broadcast by the generic access network. Instead, the mobile station falsifies a measurement report indicating the highest signal level for the generic access network frequency number as a mechanism to try and initiate handover. In order to accomplish this, the mobile station must first have registered with the generic access network and received the UARFCN and scrambling code identifying the generic access network controller GANC. The mobile station will then recognise these parameters as originating from a generic access network when they are sent by the radio network controller.

In order to perform neighbouring cell measurements, a mobile station, or rather its user equipment, must monitor the cells indicated in the so called monitored set communicated by the RNC. Neighbouring cells may be located on the same frequency as the current cell and are in this case called intra-frequency cells. For the intra-frequency cells, only the PSC need be communicated by the RNC. The neighbouring cells may also use frequencies or even radio access technologies (RAT) that differ from that of the mobile station's current cell. For the inter-frequency cells, both the frequency and the PSC are communicated by the RNC. However, when the radio access technology used is wideband code division multiple access (WCDMA) the monitoring of frequencies is complicated by the fact that many mobile stations are unable to monitor different frequencies simultaneously. Specifically, when inter-frequency or inter-RAT neighbouring cells are included in the monitored set, the user equipment must be configured to enter so-called "compressed mode", which means that the network must create time gaps for the user equipment, during which it can tune into another frequency and perform the requirement measurements. This obviously costs both time and capacity and also uses power, reducing the mobile station battery lifetime. For this reason, it is preferable to have a mobile station monitor the intra-frequency neighbouring cells, i.e. cells sharing the same frequency as the current cell.

When a generic access network cell is assigned a different frequency number, i.e. is an inter-frequency neighbouring cell, the cost is still greater, as a GAN enabled mobile will not actually perform frequency measurements on this frequency, but the network will still create time gaps. Moreover, mobile stations that are not GAN enabled will be constrained to search for a frequency that is not actually broadcast. Currently, there is no mechanism by means of which the generic access network controller can identify the frequency number used in a PLMN cell.

The mobile station must be registered with a GANC prior to handover being triggered and the WCDMA cell identity of the current serving cell used by the mobile station is communicated to the GAN in registration or registration update procedures. Conceivably, therefore, the GAN or GANC could be configured with an extensive database mapping WCDMA cell identities to WCDMA radio frequency numbers to enable a GANC to identify the UARFCN of the cell currently serving the mobile station and subsequently enable the GANC to identify itself to the mobile station as a cell on the same frequency, i.e. as in intra-frequency cell. However, notwithstanding the size required for such a database (a single WCDMA network can contain tens of thousands of cells), such a configuration would be impossible to maintain efficiently as it would need frequent updating to keep abreast of cell changes and network restructuring.

In the light of this difficulty there is a need for a mechanism whereby the GAN frequency number can be configured to correspond to that of the mobile stations current WCDMA cell, but which also retains the limited configuration or "plug-and-play" nature of GAN.

SUMMARY OF THE INVENTION

The above object is achieved in a method of facilitating handover to an unlicensed access network controller as defined in the appended claims.

More specifically, the invention resides in a method of facilitating handover of an active call or packet session conducted between a mobile station and a WCDMA public land mobile network via a public land mobile network cell controlled by a radio network controller from this public land mobile network cell to an unlicensed access network cell that is served by an unlicensed access network controller connected to the WCDMA public land mobile network. This method includes the steps of: in the unlicensed access network controller, receiving a register request message from the mobile station, and extracting from this message information indicative of a radio frequency used in the public land mobile network cell; adopting this radio frequency as an identifying frequency for the unlicensed access network controller in the public land mobile network cell to enable the mobile station to report a signal strength for the unlicensed access network cell to radio network controller without indicating a radio frequency that is different from that used in public land mobile network cell, and sending a register accept message to the mobile station, the register accept message including information indicative of the adopted radio frequency together with an identifier for said unlicensed access network controller.

By obtaining the currently used radio frequency and transmitting this as an identifying frequency to the mobile station, the mobile station is able to recognise the unlicensed access network as an intra-frequency neighbouring cell. Measurement reports identifying the unlicensed access network cell will not require mobile stations to search different frequencies and loss of capacity is thus avoided.

Preferably, the identifier is a scrambling code that can be used by the mobile station to identify the unlicensed access network controller when reporting a signal strength from the unlicensed access network cell to radio network controller. In this way, measurement reports need not include an indicator of the radio frequency, but simply use this scrambling code.

In accordance with a preferred embodiment the method includes the further step of selecting the identifier for said unlicensed network controller using the information indicative of a radio frequency. In this way, a unique identifier may be obtained by the unlicensed access network controller by simply using a mapping of the radio frequency to the indicator.

The size of the mapping table may be reduced in accordance with a preferred embodiment when the unlicensed access network controller also receives information identifying at least one of the public land mobile network and said public land mobile network cell as part of the register request message. The method then advantageously includes the step of selecting the identifier for the unlicensed network controller using the identifying information for the public land mobile network and or public land mobile network cell.

In accordance with a further aspect, the invention also resides in a method of facilitating handover of an active call or packet session between a mobile station and a WCDMA public land mobile network via a public land mobile network cell defined by a radio network controller from the public land mobile network cell to an unlicensed access network cell controlled by an unlicensed access network controller connected to the WCDMA public land mobile network, the method including the steps of: the mobile station registering with the unlicensed access network controller, this registration including: transmitting a message containing information identifying a radio frequency used in the public land mobile network cell, and receiving from the unlicensed access network controller a register accept message containing information indicative of the same radio frequency for use in identifying the unlicensed access network controller in the public land mobile network cell, and transmitting a measurement report to the radio network controller, the measurement report indicating a signal strength for the unlicensed access network cell without indicating a radio frequency that is different from that used in the public land mobile network cell.

In accordance with a still further aspect, the invention resides in an unlicensed access network controller adapted to provide access to at least one WCDMA public land mobile network for mobile stations located within unlicensed access network cells controlled by the unlicensed access network controller and to accept handover of active calls or packet sessions conducted between mobile stations with one of the public land mobile networks via a public land mobile network cell controlled by a radio network controller. The unlicensed access network controller is adapted to receive a registration request message from a mobile station prior to handover, this registration request including information identifying a current public land mobile network cell serving the mobile station and information indicative of the radio frequency of the current serving public land mobile network cell. The unlicensed access network controller is further adapted to adopt this radio frequency in combination with an identifying code as an identifier for an unlicensed access network cell capable of accepting handover of an active call or packet session with the mobile station from the current public land mobile network cell, and to transmit a registration accept message including information indicative of this radio frequency and the identifier to the mobile station.

BRIEF DESCRIPTION OF THE DRAWINGS

Further objects and advantages of the present invention will become apparent from the following description of the preferred embodiments that are given by way of example with reference to the accompanying drawings. In the figures.

DETAILED DESCRIPTION OF THE DRAWINGS

Figure 1:
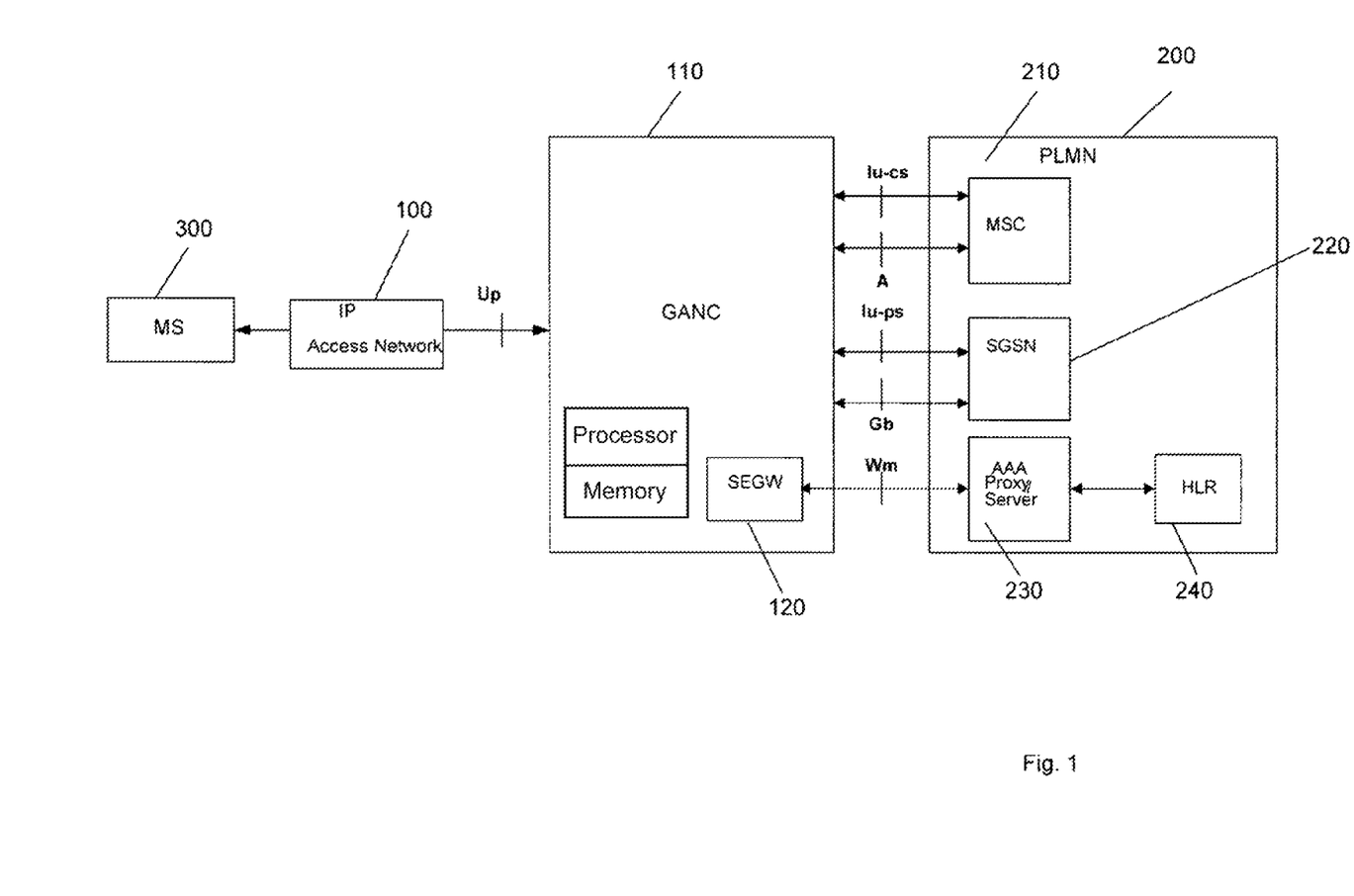
FIG. 1 illustrates schematically the functional architecture of a generic access network that supports both second and third generation services offered by a public land mobile network.

FIG. 1 illustrates how a mobile station 300, hereinafter referred to as MS, connects to a public land mobile network 200, hereinafter referred to as PLMN via a generic access network (GAN) or unlicensed access network. The generic access network includes a broadband access network 100, which in the present embodiment is an IP network and may include both wireless and wired portions, and a generic access network controller 110, hereinafter referred to as GANC. The MS connects to the IP access network 100 either directly or via a non-shown access point. The GANC 110 communicates with the mobile station over the IP access network 100 using an interface defined as Up. This interface defines both the connection through the IP network 100 and the air interface between the MS 300 and an access point that uses an unlicensed radio technology, such as Bluetooth, DECT, Wi-Fi or the like.

Within the GANC 110 there is shown a security gateway 120, hereinafter referred to as SEGW. Whilst this element is illustrated as part of the GANC 110, it should be understood that the SEGW 120 may be comprised in a separate node, although it will always be functionally associated with the GANC 110. The SEGW 120 serves essentially to terminate secure remote access tunnels from the MS 300 through the access network 100, providing mutual authentication, encryption and data integrity for signalling, voice and data traffic.

Within the PLMN 200 two switching nodes are illustrated. These are a mobile services center MSC 210 handling circuit-switched, or voice, traffic and a serving GPRS support node SGSN 220 for handling packet-switched traffic, such as data, video or VoIP traffic. A third node is the authentication, authorisation and accounting (AAA) proxy or server 230, which communicates with the security gateway SEGW 120 and a home location register HLR 240. The structure and operation of both the AAA proxy or server and the home location register 240 as well as their interaction with, for example, the MS 300 is known in the art and will not be described further here. Furthermore, it should be understood that only those elements that are necessary for describing the present invention are depicted in FIG. 1. Those of ordinary skill in the art will know that both elements may include or interact with other elements that are not illustrated in the figures.

The generic access network 100, 110 is essentially transparent when viewed from the PLMN core network nodes. This is achieved by the GANC 110 utilising the standard PLMN interfaces towards the various nodes. In the present embodiment, the GANC 110 and PLMN 200 both support 2nd and $3^{rd}$ generation mobile services. In other words, these support GSM (Global System for Mobile Communication), EDGE (Enhanced Data rates for GSM Evolution) and GPRS (General Packet Radio Service networks) services as well as UMTS (Universal Mobile Telecommunications System) or WCDMA (Wideband Code Division Multiple Access) services. Accordingly, the GANC 110 utilises the A-interface towards the mobile services switching center MSC 210 for 2G voice traffic (as defined in as defined in 3GPP TS 48.008) and the Gb-interface towards the serving GPRS support node SGSN 220 when providing access to 2G/GPRS services (as defined in 3GPP TS 48.018). When the GANC 110 provides access to 3G services (WCDMA/UMTS), it uses the Iu-cs interface towards the MSC 210 and the Iu-ps interface towards the SGSN 220 (as defined in 3GPP TS 25.410). The GANC 110 selects the required mode of operation for each MS 300 connected to it i.e. either GAN A/Gb mode or GAN Iu-mode as described in this document, and uses this mode as long as the MS is connected to the GANC 110.

In accordance with another embodiment, it is also possible that the GANC 110 and PLMN 200 both support only $3^{rd}$ generation mobile services i.e. only the GAN Iu mode of operation is supported.

Figure 2:
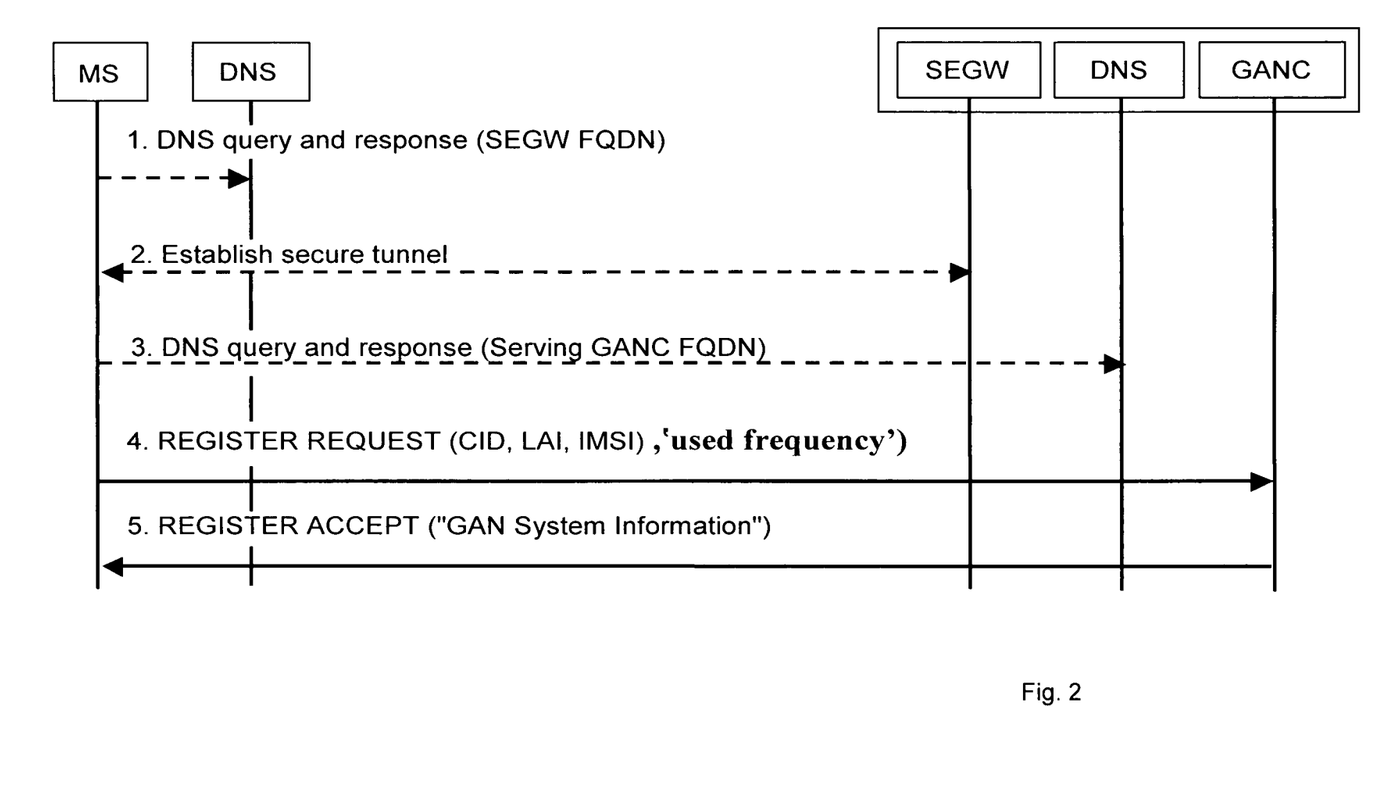
FIG. 2 illustrates the registration procedure for registering a mobile station with an unlicensed or generic access network in accordance with the present invention.

The procedure followed for handover from a third generation mobile access network, or UTRAN to a generic access network or GAN in GAN Iu mode is the subject of a defined 3GPP standard and will not be described further here. Handover presupposes that the MS will have received a list of frequency channel numbers and scrambling codes of neighbouring cells, including the identifiers used for the GANC or GAN cell, to monitor and report on and hence trigger handover. In the 3GPP standards these parameters are referred to as the UTRA Absolute Radio Frequency Channel Number or UARFCN and the Primary Scrambling Code or PSC. The GANC, or rather the generic access network or GAN cell covered by this GANC, is configured as a neighbouring cell to the RNC. Accordingly, the RNC includes the frequency channel number and scrambling code identifying this GAN cell or GANC in the list of frequencies to be monitored if the GAN cell is identified as an inter-frequency cell. For those neighbouring cells using a frequency that is the same as used in the source cell, i.e. intra-frequency cells, the RNC includes only the scrambling code identifying this cell in the neighbouring cell list to be monitored. It is further assumed that the MS has previously registered with the GANC of the generic access network as illustrated in FIG. 2. The registration procedure is described in more detail below. Circuit-switched (CS) Handover also implies that the MS is on an active call in the UTRAN. The same principles can be used for the case of PS Handover i.e. when the mobile station is engaged in a packet session in the UTRAN. Handover commences with the MS sending a Measurement Report message identifying the strength of the neighbouring cells contained in the neighbouring cell list received from the RNC. The mobile station will report the highest signal level for the GAN cell, although this will not be the actual measured signal level on GAN, but rather an artificial value that allows the MS or its user equipment to indicate preference for the GAN. Based on this Measurement Report and other internal algorithms, the RNC decides to initiate handover to the GAN cell.

When the MS and the PLMN it is connected to support WCDMA technology, the neighbouring cell frequency list sent by the RNC preferably includes only intra-frequency neighbouring cells as target cells suitable for handover, i.e. neighbouring cells, which share the same radio frequency as the current serving cell. The user equipment of some WCDMA mobile stations may be unable to monitor different frequencies simultaneously. If different frequencies are contained in the list of monitored frequencies received from the RNC, these mobile stations must be configured by the network to enter compressed mode, which means that the mobile stations must be allocated time slots for tuning to these different frequencies and perform measurements. Since only some of the mobile stations connected to the PLMN will be GAN-enabled, it is still more important that the frequency number associated with the GAN be the same as that used in the RNC cell; the mobile stations not supporting GAN would otherwise waste valuable resources attempting to measure a frequency that is not present for a cell they cannot access. In accordance with the present invention, this is achieved by modifying the registration procedure between a mobile station and the unlicensed access network or GAN to communicate the used frequency of the current serving cell to the GANC. Additionally, the GANC is configured with a small mapping table enabling the GANC to determine the correct scrambling code for use with a particular frequency number and a particular public land mobile network.

The modified registration procedure is illustrated in FIG. 2. Registration is effected with the current serving GANC, i.e. the GANC that serves the mobile station's current location. This may be preceded by a redirection procedure if the GANC with which the mobile station attempts registration—normally the GANC associated with the mobile station's home PLMN—cannot serve the mobile station at its current location. The purpose of the registration procedure is to ensure that the mobile station is registered with the appropriate GANC and to inform the GANC that the mobile station is now connected through a generic IP access network and is available at a particular IP address over an established TCP connection. It also provides the mobile station with the operating parameters associated with the generic access network service. Prior to the registration procedure, the mobile station will be provided with a fully qualified domain name (FQDN) for both the security gateway SEGW associated with the GANC and the serving GANC itself. The registration procedure thus starts at step 1. with a domain name server DNS query to resolve the SEGW FQDN into an IP address. If the mobile station has the IP address for the SEGW, this step is omitted. At step 2., a secure IPsec tunnel is established to the SEGW. At step 3., a further DNS query is performed via the secure tunnel to resolve the GANC FQDN into an IP address, unless the mobile station has such an address already. At step 4., the mobile station sets up a TCP connection to a TCP port on the GANC and attempts to register by transmitting a Register Request message. This request contains location information in the form of a cell identifier of the current serving cell. If the current serving cell is a WCDMA/UTRAN cell as for this invention, then the information consists of a LAI and a 3G Cell identity. If the current serving cell is a GSM/GERAN cell, then the cell global identifier (CGI) for the current PLMN cell would be included. Other information like the mobile station identity (IMSI) is also included. In addition to this serving cell and mobile station identity information, the register request message also includes, as part of this invention, information identifying the current frequency used in the PLMN cell if the mobile station is currently active in a UTRAN or WCDMA access network cell. This information may be the frequency number (UARFCN). At step 5., registration is accepted by the GANC with the transmission of a Register Accept message, which includes GAN system information. In the present case, the GANC decides that this registration is to use the GAN Iu-mode and the GAN system information includes cell description relating to the GAN cell, including the channel frequency number (UARFCN) and scrambling code (PSC) corresponding to the GAN cell and further includes other information like location area identification of the GAN cell and 3G cell identity for the GAN cell.

Figure 3:
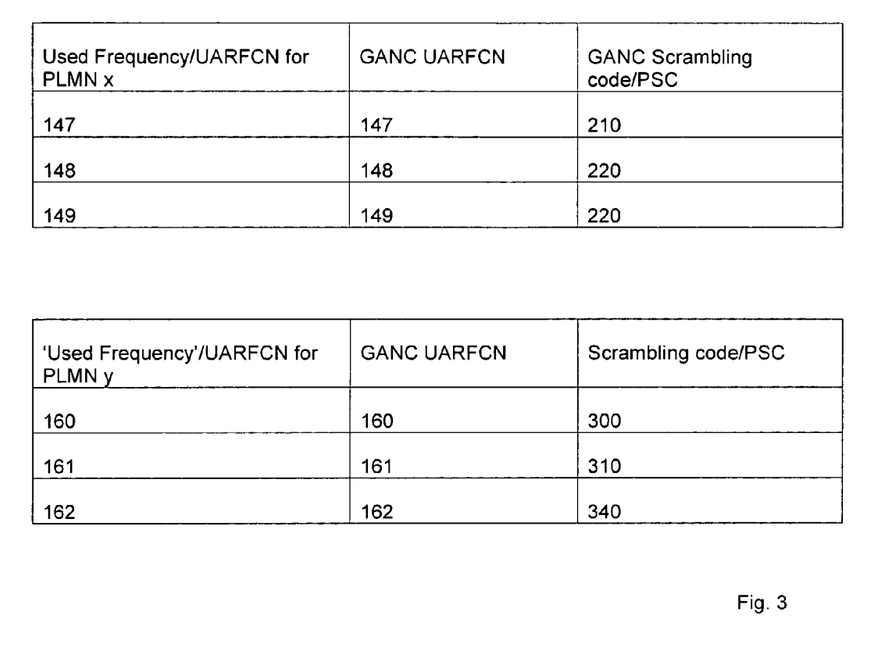
FIG. 3 shows an exemplary mapping table for mapping frequency numbers to scrambling codes for particular public land mobile networks configured in an unlicensed or generic access network controller.

The GANC is configured with a table as illustrated in FIG. 3. For each PLMN, this table includes a set of entries mapping a channel frequency number to a scrambling code or PSC. Using the 'used frequency' received in the Register Request message at step 4. and this table, the GANC is able to ascertain the correct scrambling code and transmit this with the channel frequency number in the GAN system information as part of the register accept message sent to the mobile station at step 5. Taking the example shown in FIG. 3, for the PLMN x, a used channel frequency number or UARFCN of 148 corresponds to an entry in the uppermost table and provides a GANC scrambling code or PSC of 220. Similarly, if the mobile station is currently served by an RNC of PLMNy and uses frequency 161, the GANC may adopt this frequency with the corresponding scrambling code or PSC of 310. This information is also configured in the relevant RNCs that include the serving GANC as a neighbouring cell. Consequently, if the mobile station is subsequently in active mode in a UTRAN cell and wishes to initiate handover, this may be done without needing to switch frequencies. Similarly, all mobile stations served by the neighbouring RNCs will also not be constrained to tune into a different frequency in order to compile a measurement report.

The mapping tables illustrated in FIG. 3 show a scrambling code or PSC allocated to each used frequency or UARFCN. However, this mapping could be reduced in accordance with an alternative embodiment, by defining a single PSC for each PLMN or indeed for some other portion of the reported serving cell identifiers. In this case, the GANC copies the UARFCN received from the mobile station in the register request message to the GAN system information included in the register accept message. In addition, the GANC selects the PSC from the small mapping table based on the whole or parts of the reported serving cell identifiers.

In accordance with a still further embodiment, there is no need for the mapping tables shown in FIG. 3 in the GANG. Rather than defining a scrambling code or PSC for each used frequency, the GANG is configured with a single PSC, which is used in all cells served by this GANG. In this case, the GANG copies the UARFCN received from the mobile station in the register request message at step 4. of FIG. 2 to the GAN system information included in the register accept message sent at step 5. of FIG. 2. The GANG PSC will then also be included in the register accept message.

The invention claimed is:

1. A method of facilitating handover of an active call or packet session conducted between a mobile station and a WCDMA public land mobile network via a public land mobile network cell controlled by a radio network controller from said public land mobile network cell to an unlicensed access network cell that is served by an unlicensed access network controller connected to said WCDMA public land mobile network, said method including the steps of in said unlicensed access network controller, receiving a register request message from said mobile station, said register request message including a frequency number indicative of a radio frequency used in said public land mobile network cell and extracting from said register request message said frequency number, adopting said frequency number as an identifying frequency for said unlicensed access network controller in said public land mobile network cell to enable the mobile station to report a signal strength for said unlicensed access network cell to radio network controller without indicating a radio frequency that is different from that used in public land mobile network cell, and sending a register accept message to said mobile station, said register accept message including information indicative of said adopted frequency together with an identifier for said unlicensed access network controller.

2. The method as claimed in claim 1, wherein said identifier is a scrambling code that can be used by said mobile station to identify said unlicensed access network controller when reporting a signal strength from said unlicensed access network cell to said radio network controller.

3. The method as claimed in claim 1, further including the step of selecting said identifier for said unlicensed network controller using said frequency number.

4. The method as claimed in claim 1 said step of receiving a register request includes receiving information identifying at least one of he public land mobile network and said public land mobile network cell, and further including the step of selecting said identifier for said unlicensed network controller using said information identifying at least one of the public land mobile network and said public land mobile network cell.

5. A method of facilitating handover of an active call or packet session between a mobile station and a WCDMA public land mobile network via a public land mobile network cell defined by a radio network controller from said public land mobile network cell to an unlicensed access network cell controlled by an unlicensed access network controller connected to said WCDMA public land mobile network, the method including the steps of:

said mobile station registering with said unlicensed access network controller, said registration including transmitting a message containing a frequency number identifying a radio frequency used in said public land mobile network cell, and receiving from said unlicensed access network controller a register accept message containing the same frequency number for use in identifying the unlicensed access network controller in said public land mobile network cell, and transmitting a measurement report to said radio network controller, said measurement report indicating a signal strength for said unlicensed access network cell without indicating a radio frequency that is different from that used in said public land mobile network cell.

6. The method of facilitating handover as claimed in claim 5, further including the step of: receiving an identifier for said unlicensed access network in said register accept message and including said identifier in said measurement report to identify the signal strength for said unlicensed access network cell.

7. An unlicensed access network controller adapted to provide access to at least one WCDMA public land mobile network for mobile stations located within unlicensed access network cells controlled by said unlicensed access network controller and to accept handover of active calls or packet sessions conducted between mobile stations with one of said public land mobile networks via a public land mobile network cell controlled by a radio network controller, said unlicensed access network controller comprising a processor associated with a non-transient memory storing instructions that cause the unlicensed access network controller to:

receive a registration request message from a mobile station prior to handover, said registration request including information identifying a current public land mobile network cell serving said mobile station and a frequency number of the said current serving public land mobile network cell, adopt said frequency number in combination with an identifying code as an identifier for an unlicensed access network cell capable of accepting handover of an active call or packet session with said mobile station from said current public land mobile network cell, and transmit a registration accept message including said frequency number and said identifier to said mobile station.

8. The unlicensed access network controller as claimed in claim 7, further adapted to select said identifying code using said frequency number.

9. The unlicensed access network controller as claimed in claim 7, further arranged to extract information identifying the WCDMA public land mobile network serving said mobile station from said register request message, wherein said controller includes stored information mapping radio frequencies to identifying codes for at least one WCDMA public land mobile network, and is arranged for consulting said stored information and using said frequency number and said information identifying the WCDMA public land mobile network received in said register request message to determine the identifying code for transmission in said register accept message.

10. The unlicensed access network controller as claimed in claim 9, wherein said stored information maps one scrambling code to a group of frequency numbers.

11. The unlicensed access network controller as claimed in claim 10, wherein said group of frequency numbers are used for a single public mobile access network.

* * * * *

UNITED STATES PATENT AND TRADEMARK OFFICE
CERTIFICATE OF CORRECTION

PATENT NO. : 8,428,031 B2
APPLICATION NO. : 12/741456
DATED : April 23, 2013
INVENTOR(S) : Nylander et al.

Page 1 of 1

It is certified that error appears in the above-identified patent and that said Letters Patent is hereby corrected as shown below:

In the Claims

In Column 9, Line 52, in Claim 4, delete "claim 1" and insert -- claim 1, --, therefor.

In Column 9, Line 54, in Claim 4, delete "he public" and insert -- the public --, therefor.

Signed and Sealed this
Thirteenth Day of August, 2013

Teresa Stanek Rea
*Acting Director of the United States Patent and Trademark Office*